(12) United States Patent
Liu et al.

(10) Patent No.: US 10,981,793 B2
(45) Date of Patent: Apr. 20, 2021

(54) ELECTROCHEMICAL DEPOSITION FOR METAL ION EXTRACTION/REMOVAL FROM WATER

(71) Applicant: The Board of Trustees of the Leland Stanford Junior University, Stanford, CA (US)

(72) Inventors: Chong Liu, Chicago, IL (US); Yi Cui, Stanford, CA (US); Tong Wu, Palo Alto, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 43 days.

(21) Appl. No.: 16/098,852

(22) PCT Filed: Jun. 29, 2017

(86) PCT No.: PCT/US2017/039934
§ 371 (c)(1),
(2) Date: Nov. 3, 2018

(87) PCT Pub. No.: WO2018/005758
PCT Pub. Date: Jan. 4, 2018

(65) Prior Publication Data
US 2019/0135638 A1    May 9, 2019

Related U.S. Application Data

(60) Provisional application No. 62/357,089, filed on Jun. 30, 2016.

(51) Int. Cl.
*C01B 32/30*     (2017.01)
*C25C 7/02*     (2006.01)
(Continued)

(52) U.S. Cl.
CPC .............. *C01B 32/30* (2017.08); *C22B 7/006* (2013.01); *C25C 1/08* (2013.01); *C25C 1/12* (2013.01);
(Continued)

(58) Field of Classification Search
CPC .. C01B 32/30; C25C 1/08; C25C 1/12; C25C 1/16; C25C 1/18; C25C 1/20; C25C 1/22; C25C 7/02
See application file for complete search history.

(56) References Cited

U.S. PATENT DOCUMENTS 9,057,139 B2 * 6/2015 Chung ................ C02F 1/46109
9,249,241 B2   2/2016 Dai
(Continued)

OTHER PUBLICATIONS

Aznan et al. Investigation of activated carbon adsorbent electrode for electrosorption-based uranium extraction from seawater. Nude. Eng. Technol. 47, 2015 pp. 579-587.
(Continued)

*Primary Examiner* — Cameron J Allen
(74) *Attorney, Agent, or Firm* — Sheppard Mullin Richter & Hampton LLP

(57) ABSTRACT

A method for extracting metal ions from water is provided that includes disposing two electrically conductive electrodes in water, where the water includes a target ion species in solution, where at least one of the electrically conductive electrodes is a functionalized electrode having species-specific adsorption of the target ion species, and providing electrical current to the electrically conductive electrodes such that the one or more target ion species are deposited to metallic form or metal oxides at the functionalized electrode by one or more electrochemical reactions.

8 Claims, 9 Drawing Sheets

(51) Int. Cl.
*C25C 1/08* (2006.01)
*C25C 1/12* (2006.01)
*C25C 1/16* (2006.01)
*C25C 1/18* (2006.01)
*C25C 1/20* (2006.01)
*C25C 1/22* (2006.01)
*C22B 7/00* (2006.01)

(52) U.S. Cl.
CPC ............ *C25C 1/16* (2013.01); *C25C 1/18* (2013.01); *C25C 1/20* (2013.01); *C25C 1/22* (2013.01); *C25C 7/02* (2013.01); *Y02P 10/20* (2015.11)

(56) References Cited

U.S. PATENT DOCUMENTS

| | | | |
|---|---|---|---|
| 2006/0076297 A1* | 4/2006 | Akahori | B01J 49/30 210/663 |
| 2011/0120879 A1* | 5/2011 | Buschmann | C25C 7/002 205/339 |
| 2014/0027301 A1 | 1/2014 | Botte | |

OTHER PUBLICATIONS

Liu et al. A half-wave rectified alternating current electrochemical method for uranium extraction from seawater. Nature Energy 2, 17007, 2017 pp. 1-8.

* cited by examiner

FIG. 2A  FIG. 2B

ELECTROCHEMICAL DEPOSITION FOR METAL ION EXTRACTION/REMOVAL FROM WATER

CROSS-REFERENCE TO RELATED APPLICATIONS

This application is a 371 of PCT/US2017/039934 filed on Jun. 29, 2017. PCT/US2017/039934 claims the benefit of U.S. Provisional Application 62/357,089 filed on Jun. 30, 2016.

FIELD OF THE INVENTION

The current invention relates to resource extraction from seawater and water treatment. More particularly, the invention relates to a method of extracting valuable metal ion resources from seawater, or removal of hazardous ions from drinking water that is based on electrochemical extraction.

BACKGROUND OF THE INVENTION

Efficient extraction of metal ions from water at low ion concentrations is of interest for various applications, such as resource extraction from seawater and water treatment. However, this is often a difficult problem with conventional physiochemical adsorption. In particular, the sorbent tends to become blocked by the cation of interest and/or by other cations.

Nuclear energy is one of the massive and mature energy sources without greenhouse gas emission. It accounts for approximately 20% electricity generation in US during 2000 to 2013 and 13% worldwide. Uranium is the key element for nuclear fuel, so the mining and recovery of uranium is of critical importance. It is estimated that ~5 million tons of uranium exists in land, while there are almost 1000 times more uranium in seawater. This huge amount of 4.5 billion tons of uranium in seawater could be supplied for nuclear energy for thousands of year. Hence there is strong motivation to develop cost and energy efficient method to extract uranium from seawater.

Although the amount of uranium in seawater is massive, the concentration of uranium is only ~3 ppb (3 mg/L). To extract uranium from its high salinity background, seawater, is extremely challenging. The general evaluation criteria for seawater uranium extraction method are capacity, kinetics and selectivity. The current state-of-the-art sorbent materials are amidoxime-based polymers. The amidoxime polymer sorbents with the highest capacities reported showed ~200 mg/g capacity in simulated seawater and 3.3 mg/g capacity in marine test for 56 days. To increase the capacity of sorbents, a number of researchers have focused on exploring materials with higher surface areas or better surface properties including inorganic oxides/sulfides, protein/biomass based sorbents, metal-organic frameworks and carbon-based sorbents. However, there are several intrinsic limitations of the physicochemical adsorption: (1) Due to the low uranium concentration in seawater, the diffusion of uranyl ion to the surface of the sorbents is slow. (2) The adsorbed cations is positively charged and would reject the incoming uranium ions due to Coulomb repulsion. Hence, a great portion of the surface active sites would not be accessible (FIG. 1A). (3) Other cations, such as sodium and calcium, have concentration many orders of magnitude higher than uranium, which results in strong competition for adsorption active sites. When undesirable species are adsorbed onto the sorbent surface, the active sites would be blocked and reduce the capacity of uranium (FIG. 1B).

What is needed is a device and method of extracting valuable metal ion resources from seawater or remove hazardous ions from drinking water that is based on electrochemical extraction.

SUMMARY OF THE INVENTION

To address the needs in the art, a method for extracting metal ions from water that includes disposing two electrically conductive electrodes in water, where the water includes a target ion species in solution, where at least one of the electrically conductive electrodes is a functionalized electrode having species-specific adsorption of the target ion species, and providing electrical current to the electrically conductive electrodes such the one or more target ion species are deposited to metallic form or metal oxides at the functionalized electrode by one or more electrochemical reactions.

According to one aspect of the invention, the electrical current includes an alternate current or direct current.

In another aspect of the invention, the conductive electrodes are carbon-based materials include carbon felt, carbon fibers, carbon nanotubes, carbon blacks, activated carbon, graphite plates, graphene, or graphene oxides.

According to a further aspect of the invention, the electrodes are functionalized with amidoxime-based chemicals.

In yet another aspect of the invention, a voltage across the electrodes alternates between a negative value and zero.

According to one aspect of the invention, the water includes seawater, lake water, river water, domestic wastewater, industrial wastewater or drinking water.

According to one aspect of the invention, the target ion species can include uranium, vanadium, copper, silver, gold, cadmium, lead, mercury, cobalt, rhodium, iridium, nickel, palladium, platinum, and rare earth metals.

In another aspect of the invention, where all the target ions are randomly distributed in the aqueous solution, where when a negative bias is applied, the target ions will start to migrate according to an external electrical field, where an electrical double layer on the surface of the functionalized electrode is formed, where the target ions in an inner layer of the electrical double layer form chelation binding to a surface of the functionalized electrode, where a metallic species of the target ion is reduced and electrodeposited as a charge neutral species to the functionalized electrode, where when the bias is removed the target ions and the electrodeposited target metallic species are left attached to the functionalized electrode surface, where other ions without specific binding redistribute on the functionalized electrode surface and release from surface active sites, where as the negative bias repeats, more target ions will attach to the functionalize electrode surface and the electrodeposited target metallic species are further deposited to grow into bigger particles relative to the target ion.

BRIEF DESCRIPTION OF THE DRAWINGS

FIGS. 2A-2E show C-Ami electrode characterization and visualization of extraction difference between physicochemical and HW-ACE methods: (2A) SEM image showing the morphology of the C-Ami electrode; (2B) SEM image showing the surface of the C-Ami electrode with activated carbon and amidoxime polymer, where the inset shows the porous structure of the surface coating with a higher magnification; (2C) FTIR spectrum of the C-Ami electrode; (2D) Cyclic voltammograms of uranyl nitrate in real seawater with concentration of 10 ppm and 1000 ppm comparing to pristine real seawater; (2E) Pt and U EDX element analysis mapping on a patterned Pt electrode coated with amidoxime thin film, where the uranium distribution matches the Pt pattern, indicating better adsorption efficiency of HW-ACE method than traditional physicochemical method, according to embodiments of the current invention.

DETAILED DESCRIPTION

Figure 1A:
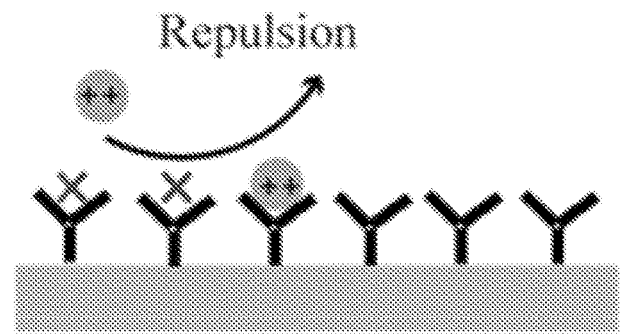
FIGS. 1A-1D show schematic views of the physicochemical and HW-ACE extraction; (1A) coulomb repulsion in the physicochemical adsorption, where the adsorbed charged ions can reject incoming ions; (1B) competition between uranyl ions and other cations that reduces the adsorption of uranyl ions and results in blocking of active sites; (1C) physical processes in HW-ACE extraction that includes step I with all ions dispersed in seawater solution in a random manner, step II the ions start to migrate according to the external electric field and form an electrical double layer (EDL) adsorbed uranyl ions can form specific binding to the electrode surface, step III adsorbed uranyl ions can be reduced to charge neutral species such as UO2, step IV bias is removed and other ions without specific binding will be rejected to the solution again, step V adsorption and electrodeposition of uranyl ions continue and UO2 grow into bigger particles, where voltage alternates between a negative value and zero with equal duration; (1D) Additional hydrothermal reaction to substitute the nitrile functional groups on PAN polymer with amidoxime functional groups. according to embodiments of the invention.
Figure 1B:
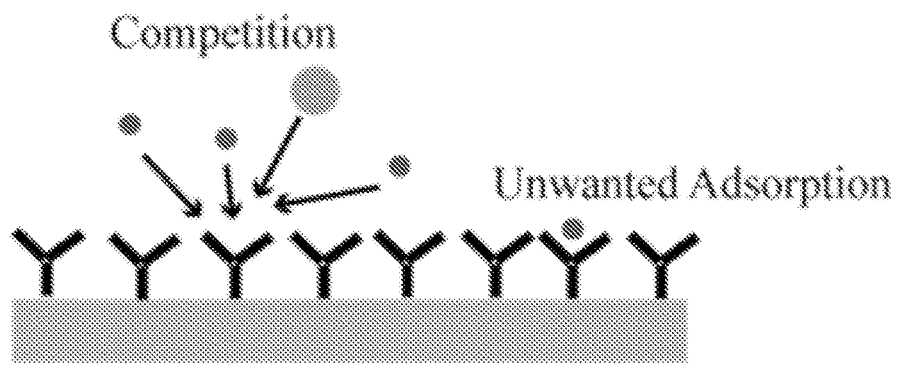

Nuclear energy, as a mature energy source, possesses potential to supply in part the massive global energy demand with minimal greenhouse gas emission. Therefore how to secure vast resources of uranium for nuclear energy fuel is inevitably important. The total amount of uranium in seawater is abundant (1000 times more than that in land) and seawater is highly accessible, so it is attractive to develop a seawater uranium extraction technology with large capacity, fast kinetics, and high selectivity. However, the challenge to extract uranium lies in its extremely low concentration (~3 ppb) in a high salinity background. Current methods that are based on sorbent materials are limited by their capacities and kinetics due to the surface-based physicochemical adsorption nature. Such methods require large quantities of materials and long periods of collection time.

A method for extracting metal ions from water is provided that includes disposing two electrically conductive electrodes in water, where the water includes a target ion species in solution, where at least one of the electrically conductive electrodes is a functionalized electrode having species-specific adsorption of the target ion species, and providing electrical current to the electrically conductive electrodes such the one or more target ion species are deposited to metallic form or metal oxides at the functionalized electrode by one or more electrochemical reactions.

The current invention provides a half-wave rectified alternating current electrochemical (HW-ACE) device and method for uranium extraction from seawater and fresh water that is based on an amidoxime-functionalized carbon (C-Ami) electrode. The amidoxime functionalization enables the surface specific binding to uranium ions. In HW-ACE method, the electrical field can migrate the ions to the electrode surface and induce electrodeposition of uranium compounds at active sites, forming charge neutral species (such as UO$_2$ and (UO$_2$)O$_2$.xH$_2$O) to avoid Coulomb repulsion. Because of the electrodeposition mechanism, uranium extraction is not limited by the electrode surface area. Moreover, the alternating manner of the applied voltage can prevent unwanted cations from blocking the surface active sites and also avoid water splitting. As a result, the HW-ACE method achieves a 9-fold higher uranium extraction capacity (1932 mg/g) without saturation and 4-fold faster kinetics than conventional physicochemical methods, as well as high selectivity inherited from the amidoxime functionalization.

In general, the method according to the current invention relies on electrochemical deposition to extract/remove ions from water combined with appropriately functionalized electrodes. According to embodiments of the invention, a pair of conducting electrodes (carbon or metal mesh/foam based with functional coatings) is used for metal ions to be deposited on. The surface functionalization of an electrode (polymers, graphene oxide, etc.) is provided to increase the selectivity to certain metal ions while still providing electrical conductivity. Also the electrochemical potentials (bias) and frequency can be tuned to only deposit certain metal ions.

According to one example, uranium extraction from seawater is accomplished by a half-wave rectified alternating current electrochemical reaction. Here an alternating voltage is used to extract uranium (as uranyl ions) from seawater. In this example embodiment, the electrode used is an Amidoxime functionalized carbon felt electrode.

According to one aspect of the invention, the electrical current includes an alternate current or direct current.

In another aspect of the invention, the conductive electrodes are carbon-based materials include carbon felt, carbon fibers, carbon nanotubes, carbon blacks, activated carbon, graphite plates, graphene, or graphene oxides.

According to a further aspect of the invention, the electrodes are functionalized with amidoxime-based chemicals.

In yet another aspect of the invention, a voltage across the electrodes alternates between a negative value and zero.

According to one aspect of the invention, the water includes seawater, lake water, river water, domestic wastewater, industrial wastewater or drinking water.

According to one aspect of the invention, the target ion species can include uranium, vanadium, copper, silver, gold, cadmium, lead, mercury, cobalt, rhodium, iridium, nickel, palladium, platinum, and rare earth metals.

In another aspect of the invention, where all the target ions are randomly distributed in the aqueous solution, where when a negative bias is applied, the target ions will start to migrate according to an external electrical field, where an electrical double layer on the surface of the functionalized electrode is formed, where the target ions in an inner layer of the electrical double layer form chelation binding to a surface of the functionalized electrode, where a metallic species of the target ion is reduced and electrodeposited as a charge neutral species to the functionalized electrode, where when the bias is removed the target ions and the electrodeposited target metallic species are left attached to the functionalized electrode surface, where other ions without specific binding redistribute on the functionalized electrode surface and release from surface active sites, where as the negative bias repeats, more target ions will attach to the functionalize electrode surface and the electrodeposited target metallic species are further deposited to grow into bigger particles relative to the target ion.

A second example is provided that includes heavy metal removal by electrochemical deposition. Here a DC voltage is applied between two conducting electrodes (carbon felt with graphene oxide or carbon felt with amidoxime polymer). During operation, the trace amount of hazardous heavy metal ions are deposited on the negative electrode.

This current invention can be applied to extract valuable metal resources from seawater such as uranium, vanadium, copper, etc. This technology can also be applied to remove heavy metal ions such as cadmium, copper, lead, mercury, etc. from drinking water.

Significant advantages include providing a significantly larger extraction capacity than traditional physiochemical adsorption. The electrochemical extraction according to the current invention has a capacity above ~2000 mg/g without saturation, compared to a 100-200 mg/g capacity based on traditional physiochemical adsorption. The current invention offers faster kinetics than traditional physicochemical adsorption. The applied voltage introduces an electric field in the system, where ions migrate according to the electric field to find the electrode surface more easily than random diffusion. A further advantage of this technology is an increased lifetime of the materials used and a reduction in the potential damage to the material during recycling with same amount of initial material use. The extraction/removal efficiency compared to the conventional technology is much higher. Therefore, for the same amount of operation time, this technology offers better ion extraction/removal. Therefore the overall extraction/removal efficiency is much higher.

According to further embodiments, the invention can have different types of electrode materials based on different applications. The electrode surface modification enhances the selectivity to the target ions. In other embodiments, the invention can be used in either flow devices or stationary systems.

Figure 1D:
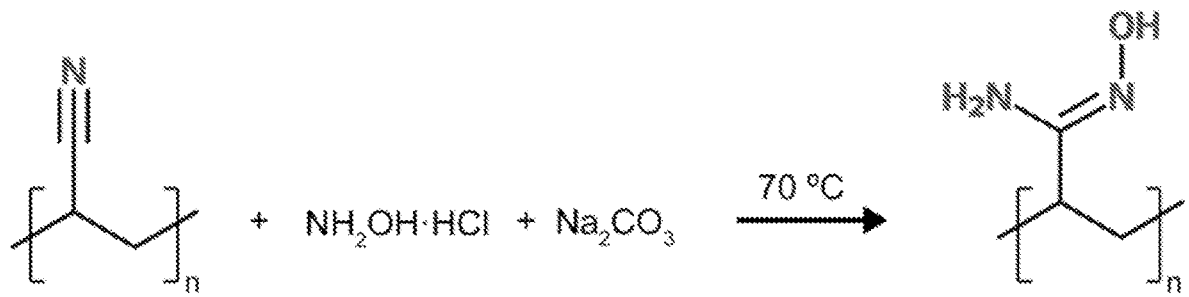
Figure 1C:
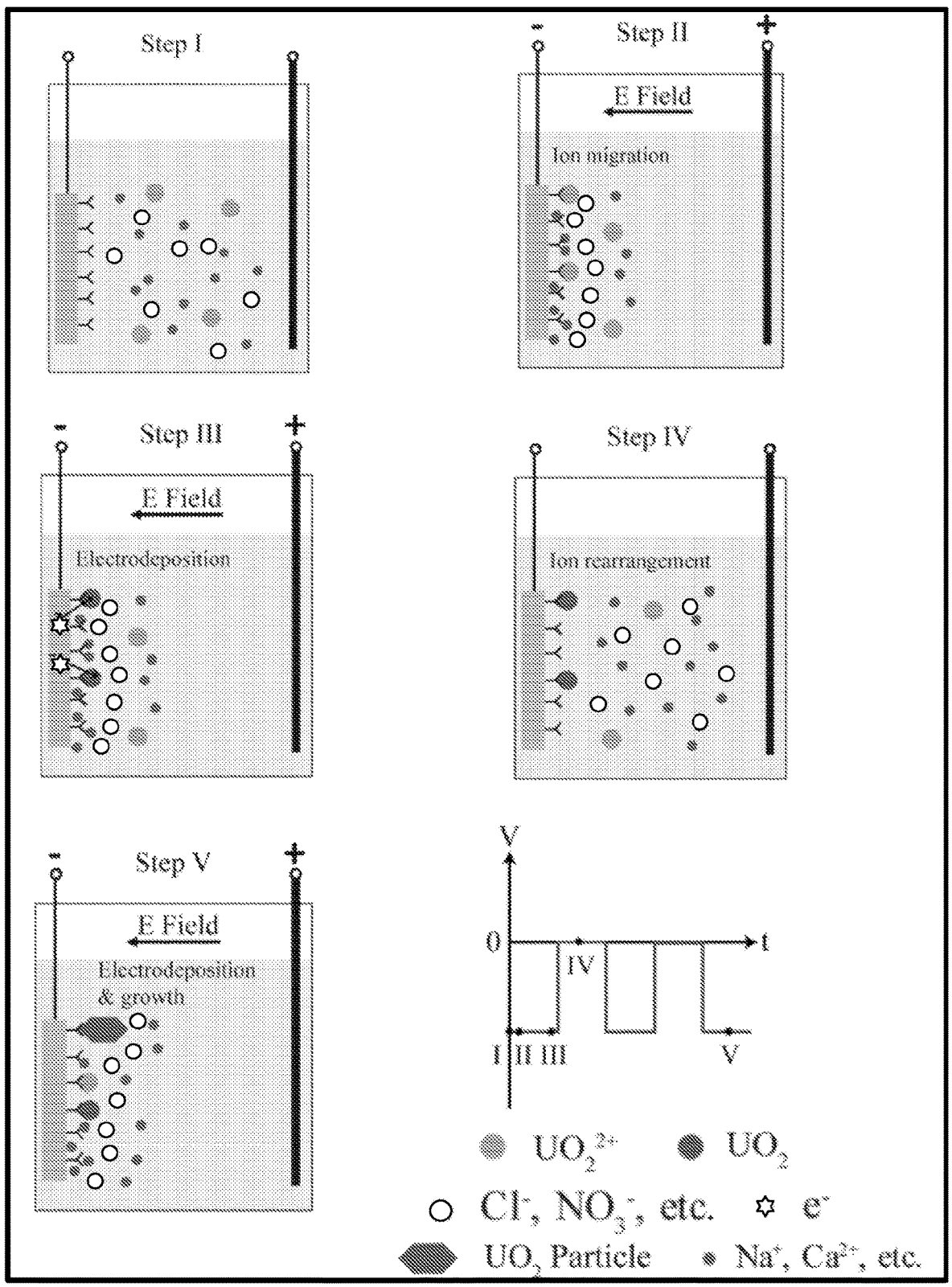

Turning now to the figures, a HW-ACE method to extract uranium from seawater is shown in FIG. 1C. In one example, an amidoxime-functionalized electrode was used because amidoxime can provide chelation sites that preferably bind to uranyl ions (UO22+). According to one embodiment, HW-ACE extraction uses an alternating voltage applied to the carbon amidoxime (C-Ami) electrode. The voltage alternates between a negative value and zero with equal duration. The amplitude and frequency is tunable to meet the maximum extraction performance. Included herein, the details in the HW-ACE uranium extraction process are explained in five steps in the schematics. At step one, all the ions are randomly distributed in the aqueous solution. At step two, when the negative bias is applied, cations will start to migrate according to the external electric field and form an electrical double layer (EDL) on the surface of the amidoxime electrode (The physical process in the counter electrode is not included for simplicity). The uranyl ions in the inner layer of the EDL can form chelation binding to the electrode surface. At step three, uranium species can further be reduced and electrodeposited as charge neutral species, such as $UO_2$. When the bias is removed, at step four, only the uranyl ions and the electrodeposited UO2 are left attached to the electrode surface. Other ions without specific binding will redistribute on the electrode surface and release the surface active sites. As the cycle repeats, more uranyl ions will attach to the electrode surface and the deposited UO2 can grow into bigger particles. The HW-ACE method solves the conventional drawbacks of physicochemical adsorption by using electric field to guide the migration of uranyl ions to increase the collision rate onto the sorbents, using electrodeposition to neutralize the charged uranyl ions to avoid Coulomb repulsion, and using an alternating current to avoid unwanted species adsorptions.

To demonstrate the current invention, the amidoxime electrode was fabricated by first coating a conductive carbon felt substrate with a blend slurry of polyacrylonitrile (PAN) and activated carbon. The carbon felt substrate is highly conductive with fiber diameter of ~20 μm and pore size ranges from tens to hundreds of microns. The function of the nano-size activated carbon (30-50 nm in diameter) was to increase the electrode surface area and, more importantly, to enhance the electrical contact of amidoxime polymer. PAN was used as a precursor for amidoxime synthesis. A hydrothermal reaction was followed to substitute the nitrile functional groups with amidoxime functional groups (see FIG. 1D).

Figure 2C:
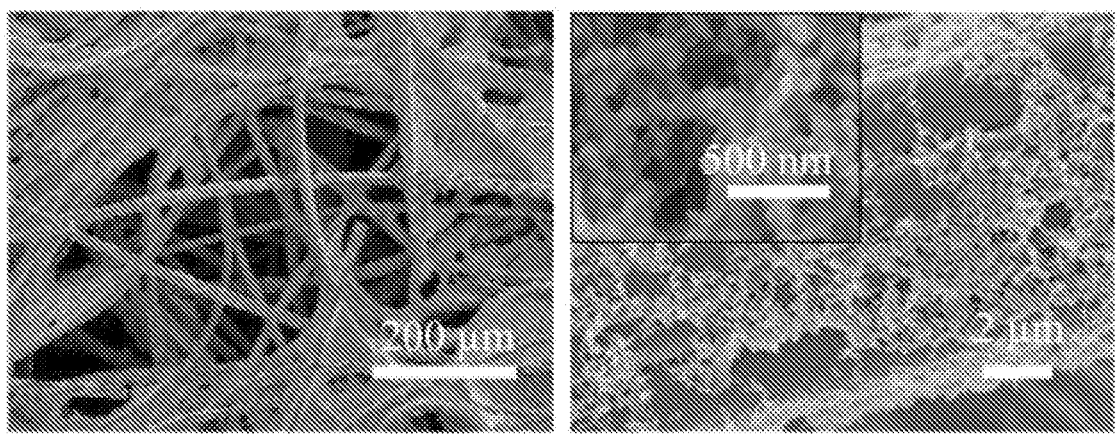
Figure 2C:
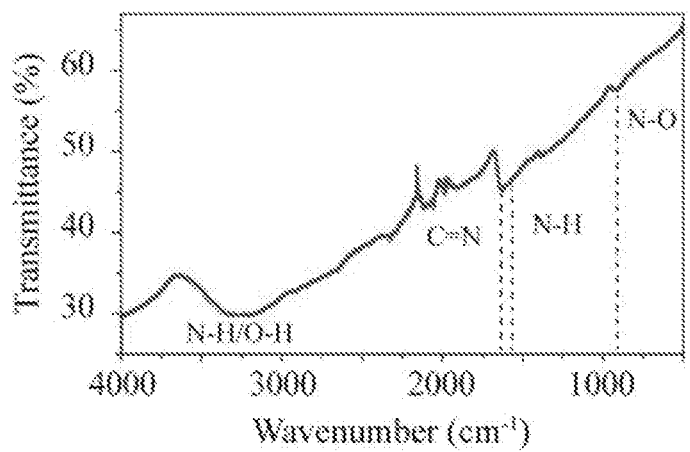
Figure 2D:
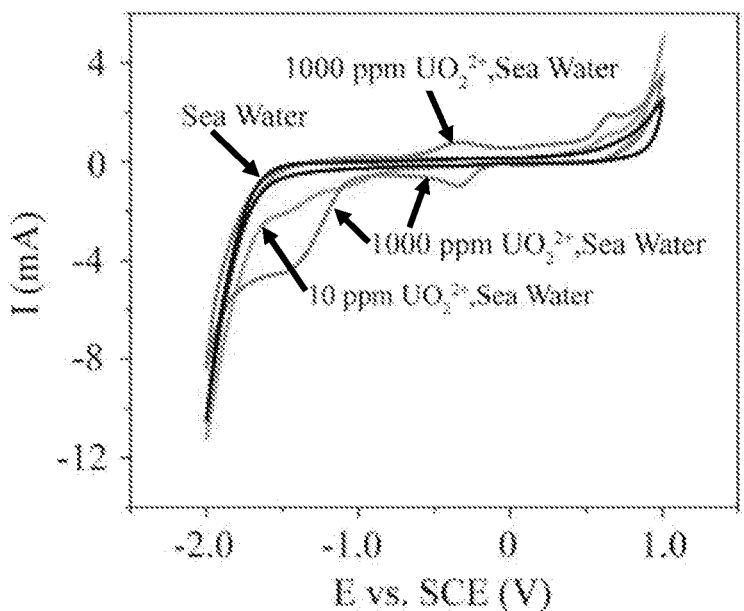

The scanning electron microscope (SEM) image in FIG. 2A shows the morphology of the C-Ami electrode. The enlarged SEM image in FIG. 2B shows that the carbon felt fibers were covered with slurry coating of activated carbon and amidoxime. The inset of FIG. 2B shows that the coating itself is also porous, with pore size of tens to hundreds of nanometers. These hierarchical pores allow efficient uranyl ion transport and maximize the usage of amidoxime active sites. The existence of amidoxime was confirmed by Fourier transform infrared spectroscopy (FTIR), and the results are shown in FIG. 2C. In the spectrum, peaks at 3100-3300 $cm^{-1}$, 1635 $cm^{-1}$, 1572 $cm^{-1}$, 912 $cm^{-1}$ represent O—H, C=N, N—H and N—O groups in amidoxime, respectively. The electrochemical characteristics of uranium was studied using cyclic voltammetry (CV), in order to investigate the uranyl species during the electrodeposition process. The CV scan curves of real seawater seeded with 10 ppm and 1000 ppm uranyl nitrate were shown in FIG. 2D, as in comparison with pristine real seawater. All seawater used was filtered by 0.2 μm filter to remove the microorganisms. In the case of pristine seawater, there was no obvious reduction/oxidation peak, so the peaks appeared in the scan curves of 10 ppm and 1000 ppm uranyl nitrate can be identified solely as uranium reduction/oxidation reactions. Both 10 ppm and 1000 ppm uranyl solution showed peak at −1.41 V (vs. SCE), which represents the reduction of $U_6$ (VI) to U (V). As for oxidation reaction, peak at −0.36 V (vs. SCE) for U (V) to U (VI) was observed. The U (V) as $UO_{2+}$ after reduction can further disproportionate into U (VI) and U (IV) automatically. This is consistent with the fact that the reduction peak of U (VI) to U (V) have much greater magnitude than the reverse oxidation peak of U (V) to U (VI) because some of the U (V) became U (IV) after formation. Among these three forms of uranium, only U (IV) is insoluble in water and would precipitate out as immobilized $UO_2$ onto the electrode surface. The electrochemical characterization data confirmed that with a reducing current, all the U (VI) ions would finally be extracted out as U (IV) in neutral oxide species.

Figure 2E:
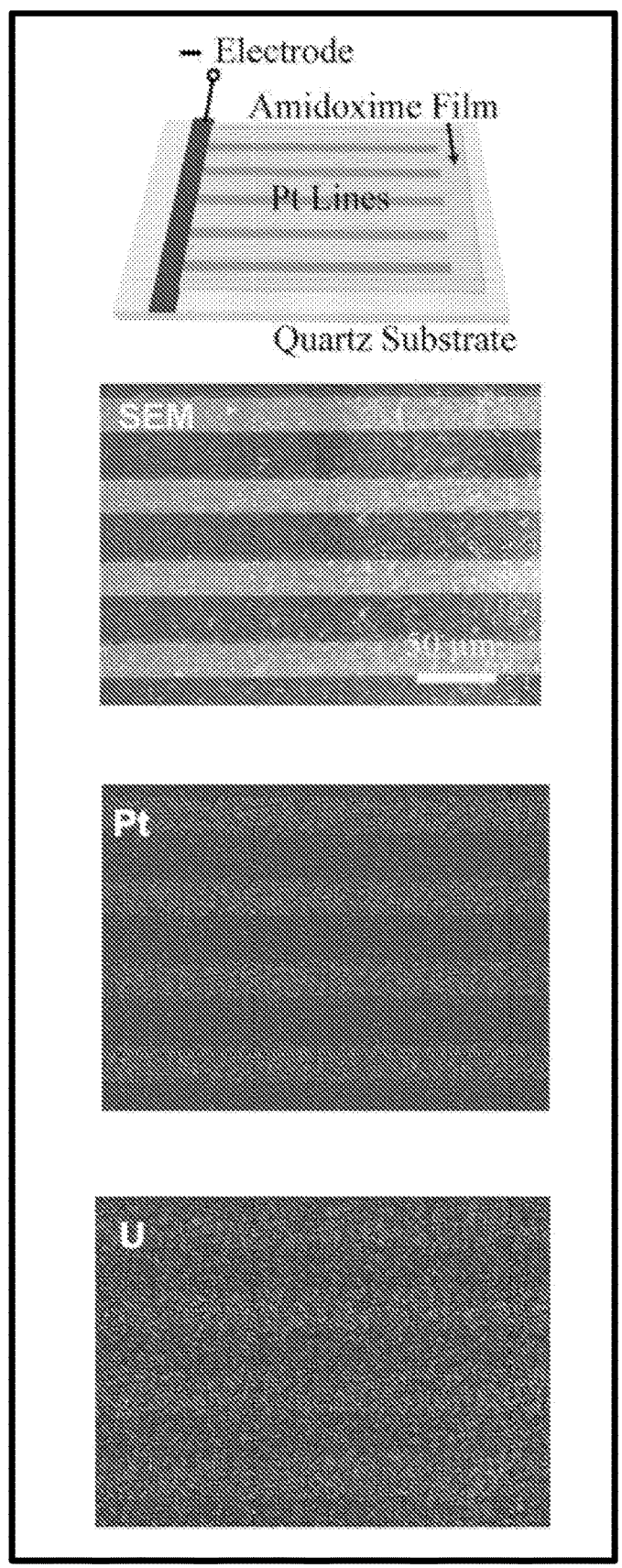
Figure 3A:
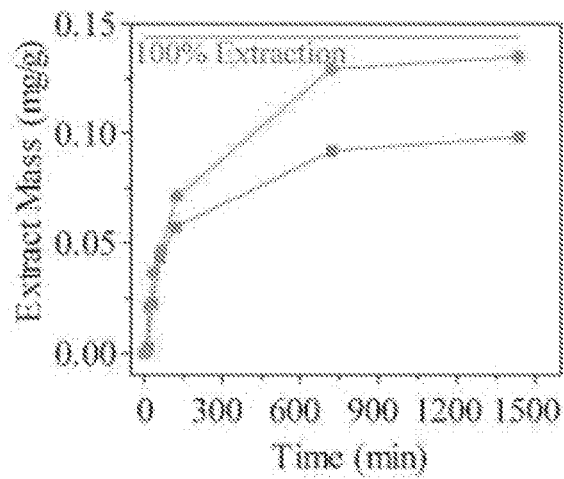
FIGS. 3A-3F show HW-ACE uranium extraction performance using real seawater background, where shown is uranium extraction from real seawater using HW-ACE method comparing to physicochemical method with initial uranium concentration of (3A) ~150 ppb, (3B) ~1.5 ppm, (3C) ~15 ppm, (3D) ~400 ppm, (3E) ~1000 ppm and (3F) ~2000 ppm, according to the current invention.
Figure 3B:
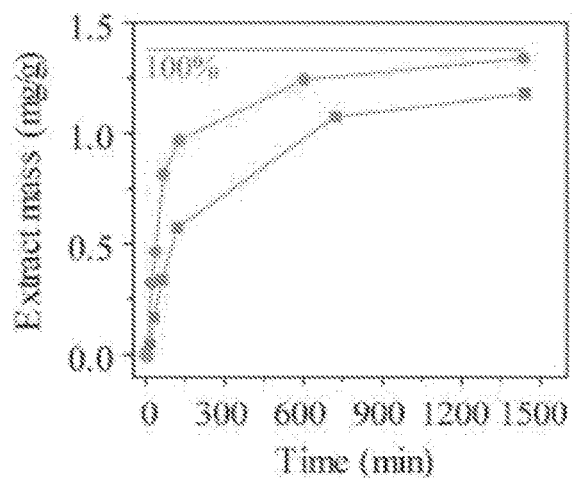
Figure 3C:
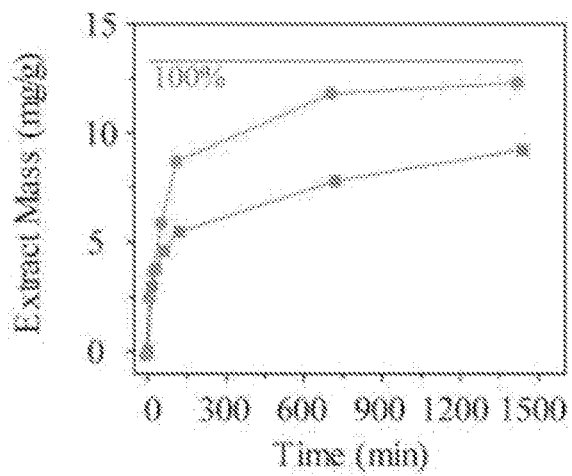
Figure 3D:
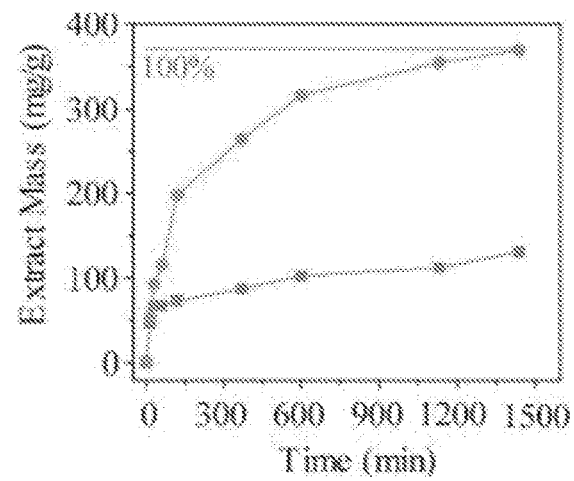
Figure 3E:
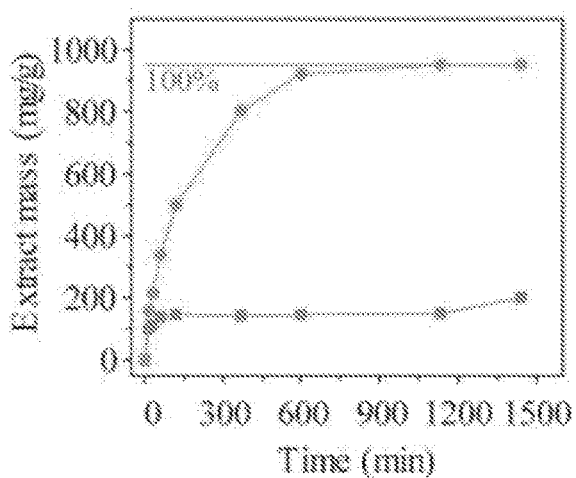
Figure 3F:
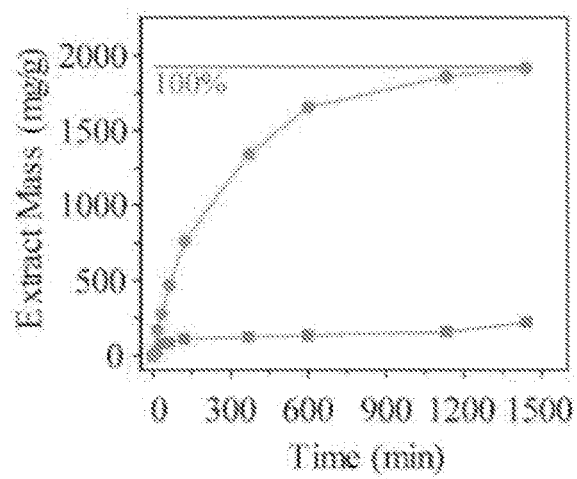

The advantages of the HW-ACE extraction comparing to physicochemical adsorption was directly visualized. A patterned electrode of parallel Pt lines was fabricated by photolithography on an insulating quartz substrate as shown in FIG. 2E. A thin layer of amidoxime polymer was coated on top of the patterned electrode. The amidoxime in contact with the bottom Pt lines would be in HW-ACE extraction, while the rest of them represents physicochemical adsorption. The HW-ACE extraction parameters were investigated using C-Ami electrode under difference bias voltage and HW-AC frequencies. Finally, square wave with voltages of −5 V to 0 V and frequency of 400 Hz was chosen based on fast kinetics and minimum water splitting. After 12 hours of adsorption, the electrode was characterized by energy-dispersive X-ray spectroscopy (EDX) mapping. The Pt and U element mapping showed that the uranium distribution on the electrode followed the pattern of Pt, which points out the fact that HW-ACE method can extract more uranium than physicochemical adsorption.

Figure 5A:
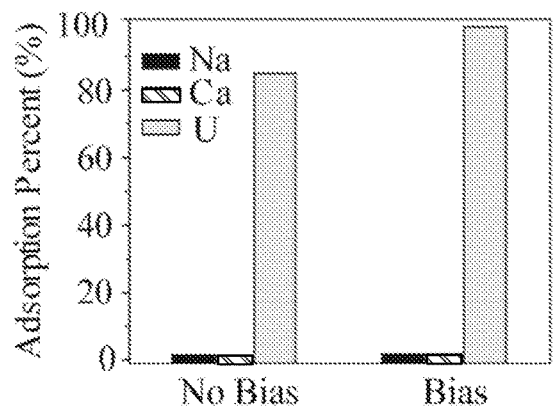
FIGS. 5A-5E show selectivity and desorption of HW-ACE method: (5A) Selectivity of uranium to sodium and calcium by HW-ACE method comparing to physicochemical method; (5B) uranium desorption percentage comparison between different extract methods, different desorption condition and elution solutions. (A: physicochemical adsorption, 0.1M Na2CO3 elution; B: physicochemical adsorption, 0.1M HCl elution; C: HW-ACE extraction, 0.1M Na2CO3 elution; D: HW-ACE extraction, 0.1M Na$_2$CO$_3$ elution with reverse bias. E: HW-ACE extraction, 0.1M HCl elution; F: HW-ACE extraction, 0.1M HCl elution with reverse bias.), (5C) comparison of physicochemical and HW-ACE extraction performance at low initial concentration (~1 ppm) by continuously feeding sea water uranium solution, where HW-ACE extraction did not show extraction performance decay while physicochemical extraction did; (5D-5E) kinetics fitting of both physicochemical and HW-ACE extraction, where the rate constant for no bias case are $4.4\times10^{-3}$ s$^{-1}$ (1st order) and $5.0\times10^{-6}$ M$^{-1}$s$^{-1}$ (2nd order), the rate constant for bias case are $1.5\times10^{-2}$ s$^{-1}$ (1st order) and $2.0\times10^{-5}$ M$^{-1}$s$^{-1}$ (2nd order), according to embodiments of the current invention.
Figure 5B:
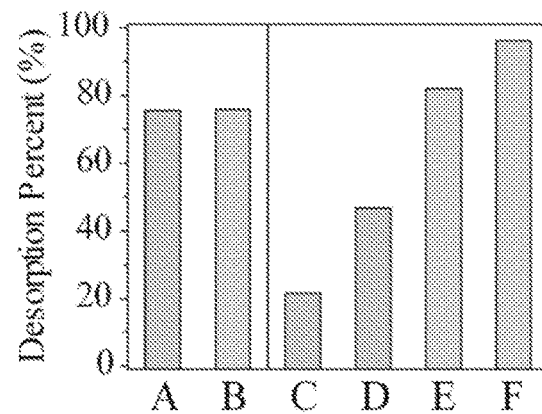
Figure 5C:
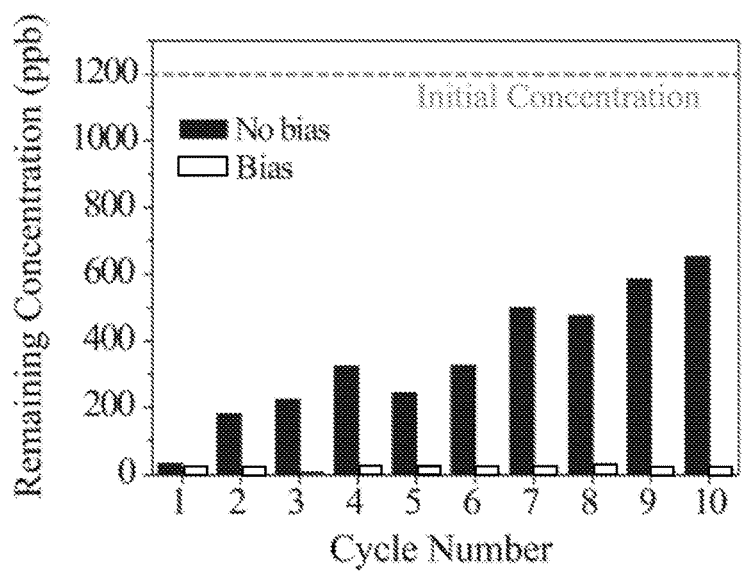
Figure 5D:
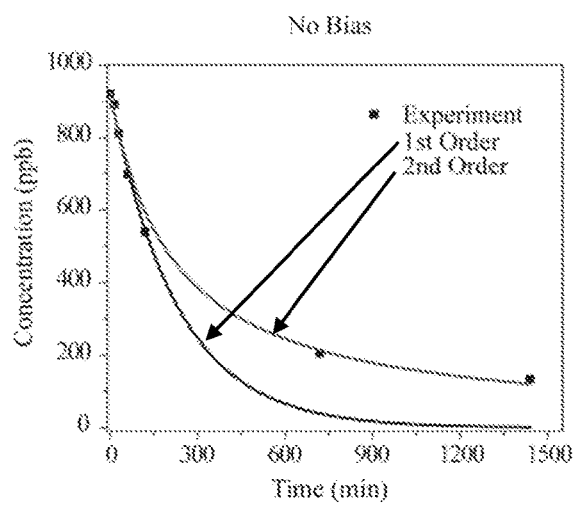
Figure 5E:
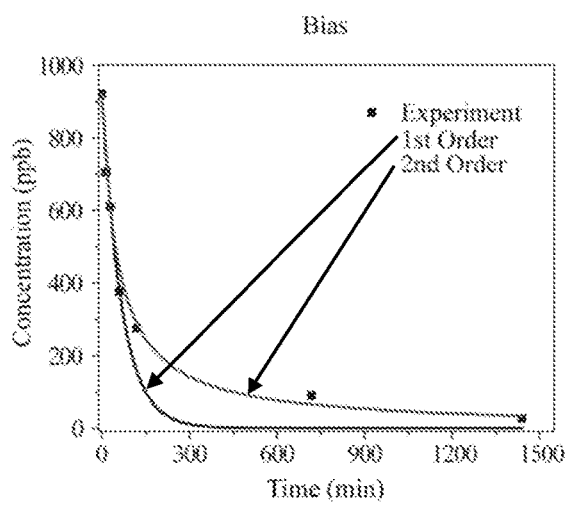

Turning now to HW-ACE real seawater uranium extraction performance. To quantitatively evaluate the uranium extraction performance, a series of extraction experiments were conducted, and the data were shown in FIGS. 3A-3F. The results reflect the capacity and kinetics difference between extraction with and without bias. In the six cases, the initial concentrations of uranyl ions were ~150 ppb, ~1.5 ppm, ~15 ppm, ~400 ppm, ~1000 ppm and ~2000 ppm, and the background solution was real seawater. C-Ami was used as the working electrode and graphite rod as the counter electrode. In all cases, the HW-AC voltage used was −5 V to 0 V with frequency of 400 Hz. The amount of uranium adsorbed on C-Ami was evaluated over 24 hours. In all six cases, the adsorbed mass of uranium by HW-ACE extraction was significantly greater than that from physicochemical adsorption, and the difference became larger with higher initial concentration. Moreover, for initial concentration of ~1000 ppm and above, physicochemical adsorption showed saturation at a capacity of 200-220 mg/g (g/kg). In sharp contrast, HW-ACE adsorption showed no saturation even at the highest initial concentration tested which gave an adsorption capacity of 1932 mg/g (g/kg) and an extraction efficiency of 99.4%. This high extraction capacity by HW-ACE was ~9 times higher than that of physicochemical adsorption. This huge capacity difference can be directly visualized by the appearance of uranium seawater solution after adsorption. Initially, the solutions appeared to be yellow color. After extraction, the seawater solution using HW-ACE extract turned completely clear without any yellow color. However, in the case of physicochemical adsorption, the yellow color remained. The extraordinary difference in extraction performance also showed up in low initial concentration case. Uranium seawater solution with concentration of 1 ppm was added to physicochemical and HW-ACE extraction every 24 hours (see FIG. 5C). Physicochemical adsorption started to show extraction efficiency decay after the 2nd cycle, and at the 10th cycle the extraction efficiency dropped to 47.3%. In contrast, the HW-ACE extraction maintained a high extraction efficiency of 99.0% throughout the entire 10 cycles. Besides much higher capacity, HW-ACE extraction also gave a faster kinetics. The adsorption kinetics was analyzed on both HW-ACE extraction and physicochemical adsorption with initial concentration of 1 ppm. Both 1st order and 2nd order reactions are fitted to the experimental data based on concentration of uranyl ions in seawater solution, as shown in FIGS. 5D-5E. The experimental data in HW-ACE extraction and physicochemical adsorption both showed better fitting to the 2nd order reaction kinetics. The reaction rate in HW-ACE extraction is ~4 folds faster than that of physicochemical adsorption according to a 2nd order reaction fitting. The quantitative analysis on uranium extraction proved that, the HW-ACE extraction not only achieved much higher capacity but also faster kinetics.

Figure 4A:
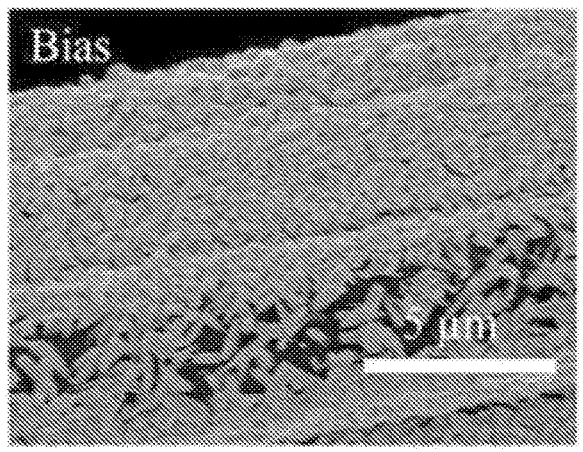
FIGS. 4A-4H show an HW-ACE extract mechanism study and extracted uranium species analysis: (4A-4B) SEM images showing the C-Ami electrode fully covered by particles after 24 hours of extraction by HW-ACE with initial uranium concentration of 1000 ppm. Higher magnification SEM image showed the morphology of the electrodeposited particles; (4C-4D) SEM images showing the morphology of the C-Ami electrode after 24 hours of extraction by physicochemical method with initial uranium concentration of 1000 ppm; (4E) XRD pattern of the C-Ami electrode after 24 hours of extraction by HW-ACE, bottom shows the XRD peaks from reference (UO2)O2.2H2O (JCPDS 01-081-9033); (4F) Raman spectrums of the C-Ami electrodes after 24 hours of extraction by HW-ACE in both air and N2 environment, in comparison to the C-Ami electrode after 24 hours of extraction by physicochemical method, and to uranyl nitrate salt and uranyl nitrate seawater solution; (4G-4H) SEM images showing the morphology of the C-Ami electrode after 24 hours of extraction by HW-ACE method in N2 atmosphere with initial uranium concentration of 1000 ppm, according to embodiments of the current invention.
Figure 4B:
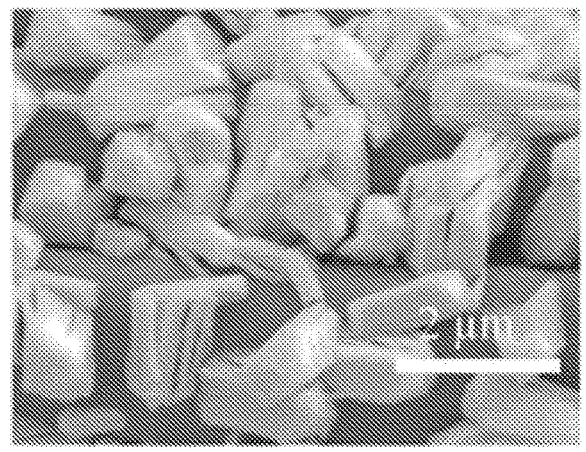
Figure 4C:
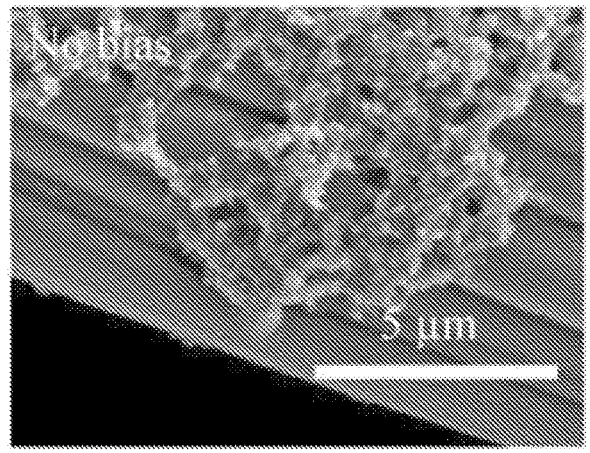
Figure 4D:
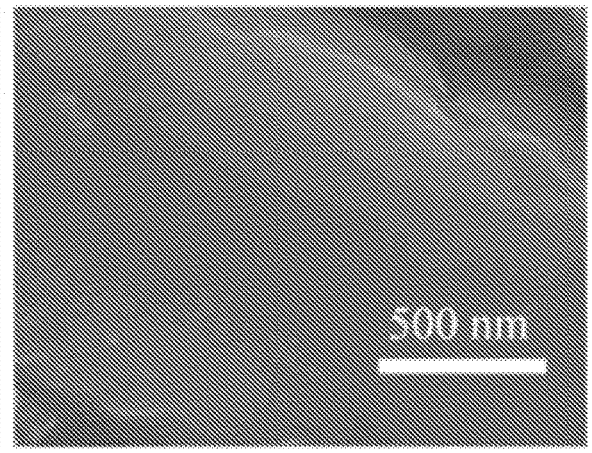
Figure 4E:
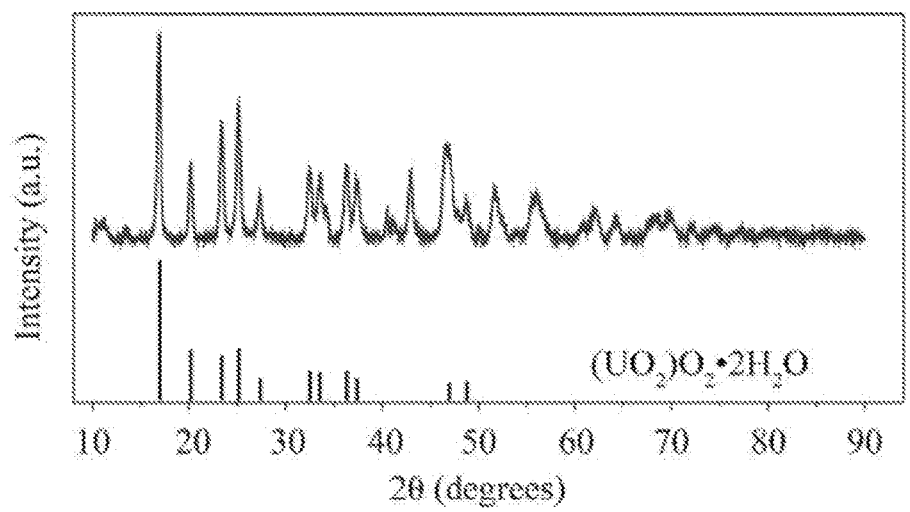
Figure 4F:
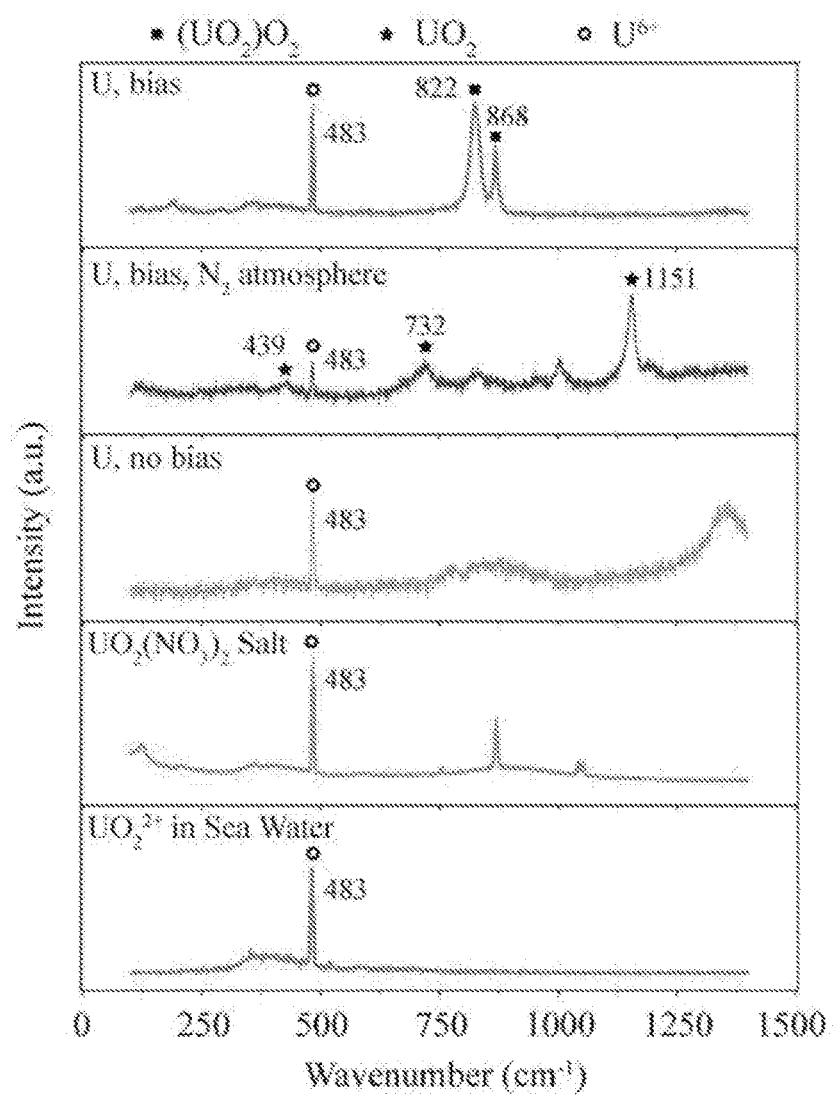
Figure 4G:
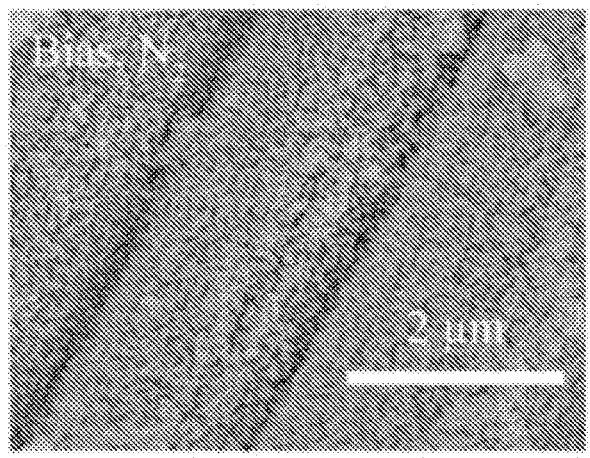
Figure 4H:
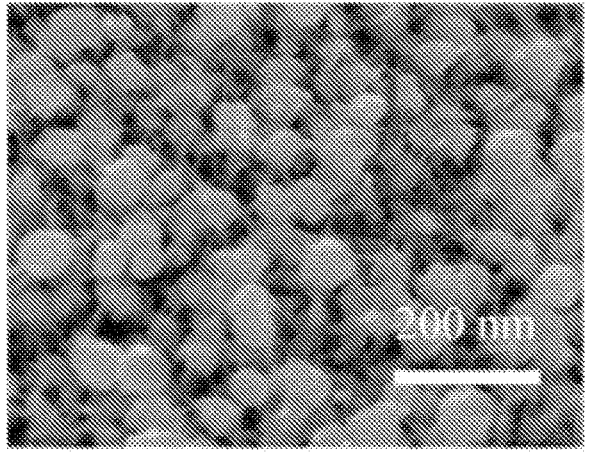

The extracted uranium species were further characterized to study the HW-ACE extraction mechanism. First, the morphologies of the adsorbed uranium after 24 hours of adsorption from both HW-ACE and physicochemical using initial concentration of 1000 ppm were characterized by SEM and the images are shown in FIGS. 4A-4D. In the HW-ACE adsorption, the C-Ami electrode was fully covered with micron particles (FIGS. 4A, 4B). The micron particles appear to be identical with layered structures and in square shapes. However, the appearance of the C-Ami without bias in the physicochemical adsorption did not show much change than the C-Ami before adsorption (FIGS. 4C, 4D and FIG. 2B). The surface of the C-Ami was smooth without any precipitate formation. This agrees with hypothesis that, in the case of HW-ACE adsorption, uranyl ions will be electrodeposited onto the C-Ami electrode forming charge neutral oxide species. Through XRD characterization (FIG. 4E), the micron particles on the C-Ami electrode surface were identified as $(UO_2)O_2.2H_2O$ species (JCPDS 01-081-9033). It is also known as metastudtite, one of the two existing uranium peroxide species. However, in the previous electrochemical characterization, the uranyl ions was supposed to be electrodeposited onto the negative electrode to form $UO_2$. The inconsistency of the electrodeposited species lead to further exploration on the HW-ACE deposition process. The first discovery of uranium peroxides were on the surface of $UO_2$ from nuclear waste as reported and the formation of $(UO_2)O_2 \cdot xH_2O$ was due to the reaction of $UO_2$ with $H_2O_2$. During the HW-ACE adsorption, there could be $H_2O_2$ generation from reducing the dissolved oxygen on the negative electrode. To prove this hypothesis, HW-ACE extraction of uranium in air and in $N_2$ was compared and Raman spectroscopy was used to identify the uranium species. Uranyl ion in seawater solution, $UO_2(NO_3)_2$ salt, and physicochemical adsorbed uranium were characterized by Raman spectroscopy as controls. From the results (FIG. 4F), it can be seen that all the controls samples showed characteristic peak from $U_{6+}$ at ~483 $cm_{-1}$. For the HW-ACE adsorption in air, two peaks at 822 and 868 cm−1 indicate that the uranium species were uranium peroxide, $(UO_2)O_2 \cdot xH_2O_{33}$. This is consistent with the XRD result. If HW-ACE extraction was performed in $N_2$ atmosphere without $O_2$, Raman spectroscopy showed different peaks at 439, 732 and 1151 $cm^{-1}$, which belong to $UO_{232}$. This is consistent with the prediction by the electrochemical characterization. The Raman results revealed that, during HW-ACE extraction, uranyl ions adsorbed onto C-Ami were first electrochemically reduced to $UO_2$, which then reacted with the $H_2O_2$ generated from oxygen reduction reaction, so the final extracted uranium species became $(UO_2)O_2 xH_2O$. Indeed, the $UO_2$ species from the HW-ACE extraction under $N_2$ atmosphere showed different morphology than $(UO_2)O_2 \cdot 2H_2O$ as shown in FIGS. 4G, 4H. The particles attached were in spherical shape with diameters of 50-100 nm. These $UO_2$ particles are in amorphous phase by XRD characterization. From the analysis of extracted uranium species, it can be concluded that whether the recovered uranium becomes $UO_2$ or $(UO_2)O_2 \cdot 2H_2O$ depends on the water oxygen level. In real application of seawater uranium extraction, this is determined by the depth in the sea. Nevertheless, either $UO_2$ or $(UO_2)O_2 \cdot 2H_2O$ is charge neutral oxide species and could facilitate further electrodeposition to ensure a much larger extraction capacity than physiochemical adsorption.

Besides capacity and kinetics, HW-ACE showed great selectivity to uranium. The selectivity of uranium over other ions comes from the amidoxime functional groups. Using solution of uranium seeded in real seawater with initial concentration of 1 ppm, the molar concentration ratios of sodium to uranium and calcium to uranium are ~$1.0 \times 10^5$ and ~$2.5 \times 10^3$. The extraction efficiency of U, Na and Ca is 99.0%, 1.5% and 1.4% in HW-ACE extraction and 85.3%, 1.2% and 0.9% in physicochemical extraction as shown in FIG. 5A. The selectivity of U over Na and Ca were $6.5 \times 10^6$ and $1.4 \times 10^5$ for HW-ACE extraction and $7.0 \times 10^6$ and $2.3 \times 10^5$ for physicochemical extraction. This result proves that the HW-ACE extraction still possess the high selectivity from amidoxime functional group but with a much higher capacity and kinetics. Finally, desorption was conducted to evaluate the recovery percentage of uranium. In traditional physicochemical adsorption, uranyl ions adsorbed on the amidoxime polymer surfaces can be eluted by both $Na_2CO_3$ and HCl solution with concentration of 0.1 M. As shown in FIG. 5B case A and B, $Na_2CO_3$ (A) and HCl (B) solution can recover 75.6% and 76.0% of uranyl ions after single time of elution. While in the case of HW-ACE extraction, the uranium species attached onto amidoxime polymer surfaces are $UO_2$ or $(UO_2)O_2 \cdot 2H_2O$, they can only be eluted by HCl solution with concentration of 0.1 M. As shown in FIG. 5b case C, 0.1 M $Na_2CO_3$ was used as the elution solution and only 21.6% of uranium can be recovered. Even with a reverse bias (case D), the total uranium recovered is 46.9%. The highest recovery of uranium from HW-ACE extraction was using 0.1 M HCl as elution solution (F) and with an applied reverse bias. The desorption efficiency was 96.2%. If no reverse bias was applied the desorption efficiency was 82.0% (E). Therefore, with the optimal desorption condition, 96.2% uranium can be recovered.

In summary, a new method using half-wave rectified alternating current to electrochemically extract uranium from seawater is provided. This HW-ACE method can overcome the limitations from traditional physicochemical adsorption and simultaneously achieve high extraction capacity, fast kinetics, and high selectivity. Comparing to physicochemical adsorption, this HW-ACE extraction method using CF-Ami electrode showed 9-fold higher extraction capacity of 1932 mg/g and 4-fold faster kinetics with minimum change to the selectivity of uranium to other cations such as Na and Ca. After desorption, 96.2% or uranium can be recovered.

Carbon felt (Alfa Aesar, 99.0%) was cut into 1 $cm^2$ circular shape as electrode substrates. Polyacrylonitrile (Sigma-Aldrich, Molecular Weight ~150,000), activated carbon was suspended into N, N-dimethylformamide (DMF) solvent at a mass ratio of 1:1:30. The solution was stirred overnight to form a uniform slurry. The carbon felt substrate was then dip coated with the slurry and air dried on a hot plate (70° C.). Then the coated electrode was put into water bath (25 mL) stabilized at 70° C. 80 mg/mL hydroxylamine hydrochloride (Sigma-Aldrich, 99%) and 60 mg/mL sodium carbonate was added into the water bath quickly and the reaction was kept for 90 min. After the reaction, the electrode was washed with DI water and air dried in furnace (80° C.) for use.

Cyclic voltammetry of C-Ami electrode was conducted using saturated calomel electrode (SCE) as reference electrode and graphite rod (Sigma-Aldrich, 99.995%) as counter electrode. The scan rate was 1 mV/s. Other instruments are scanning electron microscopy (SEM, FEI Nova NanoSEM 450), Fourier transform infrared spectroscopy (FTIR, Nicolet iS50), Raman spectroscopy (WITEC Raman spectrometer) XRD (PANalytical 12 Material Research Diffractometer) and X-ray photoelectron spectroscopy (XPS, SSI SProbe XPS spectrometer with Al (Ka) source). For EDX characterization, the interdigital Pt electrodes were prepared based on typical lithographic technology. Shipley 3612 Photoresist with 1 μm was first spin coated on quartz wafer followed by exposure and development. Prime refers to the use of HMDS as an adhesion promoter to help the resist stick to the wafer surface. Subsequently, a metal layer of Pt with thickness of 100 nm was deposited on the wafer by an e-gun/beam evaporator (Kurt J. Lesker Company). The photoresist was then removed in acetone. The Pt lines are 30 μm in diameter.

Uranium solution was made by dissolving uranyl nitrate salt (VWR, reagent grade) into real seawater collected from Half Moon Bay (California, USA) to different concentrations. Seawater used was filtered with 0.2 μm filter to remove the microorganisms. During HW-ACE extraction, C-Ami electrode was used as the negative electrode and graphite rod was the positive electrode. In each adsorption experiment, 15 mL of uranium solution was used. The uranium concentration was measured by inductively coupled plasma mass spectrometry (ICP-MS). The absorbed uranium mass was calculated by comparing the uranium concentration difference before and after adsorption. For HW-ACE extraction in N2 atmosphere, the beaker was sealed with uranium solution and C-ami and graphite rod electrodes in it and with electrical connections left out. Before extraction, $N_2$ was kept purging into the beaker overnight to remove dissolved oxygen. The $N_2$ purging continued until the extraction finished.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A method for extracting metal ions from water, comprising:
    disposing two electrically conductive electrodes in water, wherein said water comprises a target ion species in solution, wherein at least one of the electrically conductive electrodes is a working electrode having species-specific adsorption of said target ion species, wherein the working electrode comprises fibers of a carbon-based material covered with a porous coating; and
    providing electrical current to said electrically conductive electrodes such that the one or more target ion species are deposited to metallic form or metal oxides at said working electrode by one or more electrochemical reactions.

2. The method according to claim 1, wherein said electrical current comprises an alternate current or direct current.

3. The method according to claim 1, wherein the carbon-based material comprises one of carbon felt, carbon fibers, carbon nanotubes, carbon blacks, activated carbon, graphite plates, graphene, or graphene oxides.

4. The method according to claim 3, wherein said working electrode is functionalized with amidoxime-based chemicals.

5. The method according to claim 1, wherein a voltage across said electrodes alternates between a negative value and zero.

6. The method according to claim 1, wherein said water comprises seawater, lake water, river water, domestic wastewater, industrial waste water or drinking water.

7. The method according to claim 1, wherein said target ion species is selected from the group consisting of uranium, vanadium, copper, silver, gold, cadmium, lead, mercury, cobalt, rhodium, iridium, nickel, palladium, platinum, and rare earth metals.

8. The method according to claim 1,
    wherein all said target ions are randomly distributed in the aqueous solution,
    wherein when a negative bias is applied, said target ions will start to migrate according to an external electrical field,
    wherein an electrical double layer on the surface of said working electrode is formed,
    wherein said target ions in an inner layer of the said electrical double layer form chelation binding to a surface of said working electrode,
    wherein a metallic species of said target ion is reduced and electrodeposited as a charge neutral species to said working electrode,
    wherein when the bias is removed said target ions and said electrodeposited target metallic species are left attached to said working electrode surface,
    wherein other ions without specific binding redistribute on said working electrode surface and release from surface active sites,
    wherein as said negative bias repeats, more target ions will attach to said working electrode surface and said electrodeposited target metallic species are further deposited to grow into bigger particles relative to said target ion.

* * * * *